United States Patent [19]

Washburn

[11] 4,127,630
[45] Nov. 28, 1978

[54] REACTION BONDED SILICON NITRIDE

[75] Inventor: Malcolm E. Washburn, Princeton, Mass.

[73] Assignee: Norton Company, Worcester, Mass.

[21] Appl. No.: 637,211

[22] Filed: Dec. 3, 1975

Related U.S. Application Data

[63] Continuation-in-part of Ser. No. 370,745, Jun. 18, 1973, abandoned, which is a continuation-in-part of Ser. No. 263,578, Jun. 18, 1972, abandoned.

[51] Int. Cl.² .............................................. C04B 35/58
[52] U.S. Cl. ........................................ 264/65; 264/66
[58] Field of Search ............................... 264/65, 66, 56

[56] References Cited

U.S. PATENT DOCUMENTS

| | | | |
|---|---|---|---|
| 2,618,565 | 11/1952 | Nicholsen | 264/65 |
| 3,778,231 | 12/1973 | Taylor | 264/65 |

OTHER PUBLICATIONS

High Temperature Properties of Reaction Bonded Silicon Nitride, M.E. Washburn et al., 6 pp. Nov. 1973.

Parr et al., Preparation, Micro-Structure, and Mechanical Properties of Silicon Nitride, Special Ceramics, pp. 102–135.

Fulrath et al., Ceramic Microstructure, pp. 852 and 264–265, 853 (1966).

Evans, A. G. et al., "The Strength and Oxidation of Reaction Sintered Silicon Nitride", Jour. of Materials Sci. 5 (1970) pp. 314–325.

Primary Examiner—Donald J. Arnold
Attorney, Agent, or Firm—Oliver W. Hayes

[57] ABSTRACT

A new form of reaction bonded silicon nitride is described along with the process of making this new product. The product is characterized by isotropic structure, extremely fine pore and grain size, high strength and a high ratio of alpha silicon nitride to beta silicon nitride. The product has a density of at least 2.45 grams/cc and is essentially free of pores greater than 15 microns.

7 Claims, No Drawings

REACTION BONDED SILICON NITRIDE

RELATED APPLICATIONS

This application is a continuation in part of my co-pending application Ser. No. 370,745 filed June 18, 1973 which was a continuation in part of my application Ser. No. 263,578 filed June 16, 1972 and both now abandoned.

BACKGROUND OF THE INVENTION

Reaction bonded silicon nitride has received considerable attention in the technical literature during the last decade or so, stemming largely from work by Parr, Martin and Popper in the U.K. along with their associates, particularly those working in the British Admiralty, the Atomic Energy Establishment, and other branches of the British Government. One of the best early descriptions of the procedures for manufacturing shaped objects of silicon nitride is contained in "Special Ceramics" published by Heywood & Co., Ltd. of London in 1960, with particular reference to the article by Parr, Martin and May on pages 102 through 135. Additional details of this technology are described in U.S. Pat. No. 3,222,438 of Dec. 5, 1965, to Parr & Martin. Some of the other patents describing reaction sintered $Si_3N_4$ and its uses are British Pat. No. 895,769, British Pat. No. 1,168,499, British Pat. No. 1,266,506, U.S. Pat. No. 2,750,268 and French Pat. No. 2,074,920.

In the proceedings of the British Ceramic Society in 1967, Volume 7, pages 81 through 98, there is an article by Parr and May which, as far as can be determined, describes the current state of the art in the manufacture of shaped parts from reaction bonded silicon nitride. Such parts are currently being offered by the British firm AME (Advanced Materials Engineering, Ltd.) utilizing, it is believed, the techniques described by Parr and May in the above 1967 article. Maximum transverse rupture strength described by Parr and May is about 36,000 psi. The material offered by AME is advertised as having transverse rupture strength on the order of 30,000 psi. This seems to be representative of other material offered by other suppliers, such as Degussa, Hoffman and Carborundum Company. None of the commercially available material is advertised as having any transverse rupture strength over 30,000 psi. In the prior art as represented by Parr and May and the other British workers, silicon powder is compressed under relatively high pressure, such as isostatic pressing, or the like, to form a compact. Prior to machining to the shape of the desired part, the prior art partially nitrides the compact to provide a "green" compact which is sufficiently strong to be handled during the machining operation. After machining, the product is then fired in a nitrogenous atmosphere to convert all of the silicon to silicon nitride. In British Pat. No. 942,082, Parr states that the mixed alpha and beta $Si_3N_4$ produced by the above procedure can be largely converted to B $Si_3N_4$ by continuing the heating in a nitrogen atmosphere to 1700° C. As mentioned above, the maximum strength ever reported is the 36,000 psi. for transverse rupture strength (mentioned by Parr and May) while most of the state of the art is considered to be on the order of 20,000 to 30,000 psi. as measured by 3 point loading.

Evans and Davidge of A.E.R.E. Harwell have described (Journal of Material Sciences 5 (1970) 314–325) studies of the strength of reaction sintered silicon nitride wherein simple compacts (which had not been machined) were nitrided under various conditions. Maximum strengths were obtained with long nitriding of the compacts at temperatures below the 1400° C. melting point of silicon. The product described by Evans and Davidge had somewhat larger particle size than that employed in the present invention and a larger final pore size than in the present invention. The stress rupture strength was on the order of 41,000 psi., (although measured with a span to thickness ratio of only 4 or 5 to 1). This strength is somewhat higher than that described by other workers who have been concerned with providing shaped parts.

U.S. Pat. No. 3,778,231 to Taylor describes a development by the Birmingham Small Arms Company (BSA) which is similar to the present invention in that the starting silicon powder compact is sintered in argon. After machining, the product is fully nitrided. The Taylor patent does not describe the characteristics of the starting silicon powder and it certainly does not mention the requisite fine particle size which is essential to achieving the results of the present invention. It seems clear that Taylor's silicon powder did not, in fact, have such a fine particle size since the reaction bonded silicon nitride offered for sale by the BSA group (according to literature which is believed to have been published some time after the issuance of the British Taylor Pat. No. 1,168,499) has a transverse rupture strength on the order of 25,000 lbs. per square inch. This is typical of the other reaction bonded silicon nitride products commercially available from other sources and is well below the results achieved by the present invention.

Flame sprayed silicon nitride, used to produce shaped parts, has been reported to have stress rupture strengths on the order of 40,000 psi. These flame sprayed parts are extremely difficult to make with any appreciable sectional thickness because of the relatively higher density of the starting silicon product and the difficulty in obtaining complete nitriding of the full cross-section.

BRIEF SUMMARY OF THE INVENTION

In the present invention, the techniques of the prior art are modified in several crucial respects to obtain an end product having a much higher transverse rupture strength at room temperature and with a transverse rupture strength which continues to increase up to 1375° C. As far as can be ascertained, the material made in accordance with the Parr-May techniques appears to have a peak strength at a temperature around 1300° C. and then the strength begins to fall off rather rapidly. Evans and Davidge note very little change in strength with temperature.

In the present invention, the silicon employed as a starting material is preferably quite finely powdered, with a maximum particle size of 10 microns and an average particle size on the order of 2 microns or less. This fine silicon powder, is pressed (preferably isostatically) to a green density on the order of 1.5 grams/cc. It is then sintered under an inert gas atmosphere such as argon. The inert gas sintering furnace is preferably evacuated several times and flushed with argon to remove atmosphere contaminants as completely as possible. The sintering operation is preferably carried out at a temperature on the order of 1100° C., the time depending upon the mass of silicon. This provides a bonded product which has sufficient strength to be readily machined. This intermediate product differs drastically from the product described by Parr and May in that there is essentially no nitride present in the product at this time. This sintering operation bonds the silicon particles to each other, thus providing a continuous silicon structure. Evidence that such bonding of silicon occurs is the increased strength of the compact. Also, photomicrographs of this sintered product show bonding of the silicon grains.

The time and temperature required for this first sintering operation are determined by the density and size of the compact, the particle size of the silicon, and the strength required in the compact for machining. For example, for low density compacts, it will be necessary to increase the sintering time and/or temperature to obtain sufficient bonding of the silicon particles to achieve a continuous structure and higher density and strength in the final product. When even finer silicon is used, sintering times and temperatures can probably be decreased. While the sintering gives the compact sufficient strength to be machined, it also provides the important step of making a continuous silicon structure, from which a continuous silicon nitride structure is achieved.

After machining, the silicon mass is nitrided in accordance with standard procedures.

DETAILED DESCRIPTION OF THE INVENTION

In order that the invention may be fully understood, reference should be had to the following nonlimiting example.

EXAMPLE 1

The starting material for the process is fine grain silicon powder containing a maximum particle size of about 10 microns with an average particle size of about 2 microns. A preferred type of silicon powder is 200 XD, commercial grade, sold by Union Carbide Company. Chemical analysis of this powder showed 0.5% iron, 0.4% aluminum, and 0.1% calcium as the major impurities. Further reduction in particle size was made by passing the silicon powder through a pulverizer such as made by Majac Inc. at a feed rate of 16 pounds/hour. The average particle size distribution of this powder was 2 microns, with a particle size ranging between 0.5 and 10 microns. Twenty pounds of this powder were placed in a sealed double "Visten" bag and isostatically pressed at 52,000 psi. to a cylinder about 6 inches in diameter by 14 inches high. This cylinder was then removed from the bag, placed in a vacuum furnace which was evacuated three times, being flushed with argon each time, and was then fired at 1100° C. for 15 hours. The product was then machined to the final shape, which, in this case, was a turbine wheel for a gas turbine. During the machining, a diamond tipped mounted point in a pantograph duplicating machine was employed, the tool being controlled by a master to be duplicated. The machined turbine wheel was then placed in a nitriding furnace which consisted of a double walled gas tight silicon carbide box of about 4 cubic feet capacity which, after being loaded and sealed was placed into an electric furnace heated by silicon carbide resistance elements. The box was flooded with nitrogen and a flow of one to two cubic feet per hour of ammonia was bled into the furnace. Nitrogen was introduced into the furnace by a control valve to maintain a constant total pressure in the furnace. The temperature was brought up to 1200° C. and held for 24 hours. Thereafter it was to 1450° C. in about 100 degree increments, remaining for about 24 hours at each increment to a final soak of 15 hours at 1450° C. A test bar similar to the turbine wheel being made was analyzed and was found to have the following physical properties: density 2.4 grams/cc.; transverse rupture strength 50,000 pounds per square inch; approximate composition 0.4% iron; 0.3% aluminum; less than 0.1% calcium; 70% alpha silicon nitride; 25% beta silicon nitride. The chemical analysis was accomplished by X-ray diffraction, which also indicated the presence of some silicon carbide, about 5%. The pore size of the resulting product was less than 2 microns, with most of the pores being less than 1 micron.

EXAMPLE 2

In this example, the procedure following Example 1 was utilized, except that several test bars were run. In this case the particle size of the starting powder was 1 to 40 microns with an average of about 14 microns. This powder was isostatically pressed at 40,000 pounds per square inch, sintered in an argon furnace to 1100° C., machined to the final size and then nitrided as outlined in Example 1 above to a temperature of 1410° C. for 15 hours. The final product showed a weight gain of 61%, had a density of 2.51 grams/cc. and a transverse rupture strength of 33,000 pounds per square inch.

A number of different samples were prepared, generally in accordance with Examples 1 and 2, employing a broad range of densities and particle sizes. These are detailed in Table 1 below along with the data for Examples 1 and 2. In Examples 3, 4 and 5 the isostatic pressure was varied to control the green density as well as the density of the final product. The effect of density on strength is clearly demonstrated.

EXAMPLE 7

Example of Prior Art

I made a mix of 100 parts by weight −250 mesh (10–20 micron average) silicon and a wax binder by first dissolving 12 parts by weight per 100 carbowax 4000 which is a polypropylene glycol in enough methylene chloride solvent to form a fairly liquid slurry, the exact amount not being critical. The slurry was mixed until methylene chloride was essentially vaporized off and the mix was spread on paper and allowed to dry completely.

A 6 inch by 2 inch by ¼ inch test bar was pressed hydraulically and then put into a double visten bag, sealed, and isostatically pressed at 20,000 psi. The bar was fired in a nitrogen furnace at 250° for 24 hours with a rate of rise of 10° C per hour to 250° C to remove the carbowax. Then it was raised at 40° C per hour to 1160° to 1200° C for 24 hours, then raised to 1300°–1350° for 24 hours at a temperature somewhat higher than 1450° C for 12 hours of soak.

The test bar showed a weight gain of 43.8% on firing which is 90% of theoretical taking the carbowax burn-off into consideration. Fired density was 2.47 grams/cc. A test bar measuring 6 × ⅛ × ⅛ inch was cut from the bar with a diamond wheel. MOR at room temperature was measured on a ¾ inch span with 3 point loading. The average value was 34,800 psi., ranging from 33,500 psi. to 36,200 psi. The piece showed a granular structure similar to other prior art pieces of good quality.

EXAMPLE 8

Prior Art — Similar to BSA Technique

A billet 6 inch diameter × 12 inch, weighing about 20 lbs., was made from −250 mesh (average 10–20 microns) silicon by isostatic pressing the powder in a double visten bag and pressing at 40,000 psi. The billet was presintered in Argon at 1080° C and soaked for 15 hours. A slice ¼ inch thick was cut from the sintered billet and fired in a nitrogen furnace at 1200° C for 5 hours, raising to 1330° C for 28 hours, raising to 1410° for 15 hour soak. The slice showed 62.0% weight gain for a theoretical gain of 93%. Fired density was 2.60 grams/cc. Test bars measuring ⅛ × ¼ inch in cross section were cut from the fired slice. MOR at room temperature was measured on a ¾ inch span with 3 point loading. The average for 5 breaks was 30,600 psi. with a standard deviation of 2220 psi. X-ray diffraction pattern for this type shows about equal parts of alpha and beta silicon nitride. A fractured cross section was analyzed by a scanning electron microscope at 200x, 1000x and 5000x. Pore size was measured from the photographs. In the photograph taken at 1000x a coarse pore structure was observed. The largest pores were 6 to 10 microns in size. Typical pores were about 3 microns in size. In the photograph's field, which was approximately 100 × 100 microns, about 50 of these typical pores could be observed. The photograph was taken at a 45° inclination.

Examination of scanning electron microscope (SEM) pictures of fracture and polished sections of samples representing the prior art and the present invention were compared at amplifications of 200x to 1000x. From these it appears that the prior art can be characterized as one which will show a substantial number of pores greater than 15 microns while the product of the present invention is essentially free of pores greater than 15 microns.

silicon bonds between the various small silicon particles. This is in marked contrast to most of the product of the prior art wherein the structure which is to be machined and then finally converted to silicon nitride comprises a product held together largely by silicon nitride bonds.

It is clear that the invention product has extremely fine and uniformly dispersed pores, submicroscopic crystals, and uniform structure. Microscopic examination of the invention product reveals differences both in reflected light and in cross-polarized light. Reflected light shows the invention product to have a uniform distribution of the pores, fewer large pores, and smaller average pore size. Cross-polarized light reveals a homogeneous light and dark lace-work pattern with a fine cell structure. Prior art product shows a variable cell structure.

Examination of etched and unetched samples of product reveals few identifiable grains even at 10,000 magnifications in the invention product. The few grains observed have a size of about 3 microns. In contrast, one observes more grain structure in prior art product, and this is inhomogeneously dispersed.

The fine pore size, uniformity of structure, and uniformity of density of the product distinguishes it from the prior art. Because it is uniform and because there are no large pores to act as flaws, its strength is high.

As shown in Example 1, the process must be one which will achieve a uniform small-pored product. Thus, the particle size of the silicon is extremely fine; the silicon particles must not be agglomerated in clumps before pressing; no organic binders are used which could create inhomogeneities or pores or burnout; and the product is compacted at very high pressure to assure maximum green density, minimum pore size, and uniform structure.

It is also believed that the uniform small particle size of the material employed in the present invention pro-

TABLE 1

| Sample | | Silicon Particle Size (microns) Max. | Ave. | Isostatic Pressure (1000 psi.) | Density gr./cc. Green | Final | Max. Nitriding Temp.°C. | α to β Ratio | Final Transverse Rupture Strength* |
|---|---|---|---|---|---|---|---|---|---|
| Example | 1 | 10 | 2 | 52 | 1.53 | 2.45 | 1450° | 3 | 50,000 psi. |
| " | 2 | 40 | 14 | 40 | 1.55 | 2.51 | 1410° | | 33,000 psi. |
| " | 3 | 10 | 2 | 10 | 1.40 | 2.24 | 1410° | 3.0 | 25,000 psi. |
| " | 4 | 10 | 2 | 30 | 1.45 | 2.35 | 1410° | >2 | 40,000 psi. |
| " | 5 | 10 | 2 | 40 | 1.50 | 2.40 | 1350° | >2 | 44,000 psi. |
| " | 6 | 40 | 14 | 40 | 1.56 | 2.51 | 1350° | 7.15 | 39,000 psi. |

*Transverse Rupture Strength at room temperature measured on test bars ⅛ × ⅛ inches with a ¾ inch span, 3 point loading. Samples were surface ground.

DISCUSSION OF THE RESULTS

From the above data included in Table 1 it is apparent that the products of Examples 1 and 5 show a substantial advance over the prior art. Example 4, is closer to the state of the art and does not represent a preferred embodiment of the invention. Examples 2, 3 and 6, fall outside the scope of the invention.

While it has not been exactly proven why the present invention has such great improvement in strength, there seem to be several logical explanations for this result. In the first place, a fine powder of more or less uniform particle size is employed. This provides a structure which, upon sintering, gives a coherent bonded mass of silicon having a relatively uniform pore size which extends throughout the body. Once the product has been thermally sintered, it is held together by silicon to vides a much more uniform conversion of silicon to silicon nitride throughout each particle at a relatively low temperature. This is believed to provide for lower internal stresses in the body and to give a product having more uniform physical properties. There is a brief reference in the prior art ("Special Ceramics" published by Heywood & Co. 1960, edited by P. Popper, particularly on page 132) to the fact that with samples of silicon powder heated first in vacuo and then in nitrogen, no significant nitridation was measured. Apparently, under the conditions employed by Popper and his associates, the vacuum sintering was such as to combine the much larger silicon particles used by him into such large agglomerates that the subsequent nitriding operation was ineffective to convert a substantial portion of the product to nitride. This was probably due to the great decrease of surface area accomplished by Popper and his associates. In the present invention, however, (even though it is believed that vacuum or any other inert, nonreactive, atmosphere sintering can be utilized) the starting silicon powder is of such a fine particle size that, even though there may be some decrease in effective surface area as a result of the sintering under a nonreactive atmosphere, the remaining surface area is ported on in column 2 of Table 2 had a transverse rupture strength of 26,000 psi., which is equivalent to the reported values for the BSA material. The third column is the AME commercial material. Both the "prior art" sample and the AME material were examined at 100x magnification under a scanning electron microscope. In Table 2 there is shown a second set of three columns showing the pore size distribution per unit area.

Table 2

| Pore Size Range (microns) | Number of Pores Found in Given Area | | | Number of Pores/mm$^2$ | | |
|---|---|---|---|---|---|---|
| | Present Invention 200× (2.65 mm$^2$) | Prior Art 100× (3.09 mm$^2$) | AME 100× (4.02 mm$^2$) | Present Invention | Prior Art | AME |
| 4–5 | 59 | not measured | | 22.3 | not measured | |
| 5–6 | 26 | not measured | | 9.8 | not measured | |
| 6–7 | 17 | not measured | | 6.4 | not measured | |
| 7–8 | 7 | 6 | 6 | 2.6 | 1.9 | 1.5 |
| 8–9 | 2 | 6 | 14 | 0.75 | 1.9 | 3.5 |
| 9–10 | 4 | 6 | 3 | 1.5 | 1.9 | 0.75 |
| 10–12 | None Found | 10 | 15 | None Found | 3.2 | 3.7 |
| 12–14 | ↓ | 8 | 14 | ↓ | 2.6 | 3.5 |
| 14–16 | | 7 | 7 | | 2.3 | 1.7 |
| 16–18 | | 3 | 4 | | 0.97 | 1.0 |
| 18–20 | | 1 | 6 | | 0.32 | 1.5 |
| 20–25 | | 3 | 9 | | 0.97 | 2.2 |
| 25–30 | | None Found | 2 | | None | 0.50 |
| 30–35 | | ↓ | 1 | | ↓ | 0.25 |
| 35–40 | | | 2 | | | 0.50 |
| 40–45 | ↓ | ↓ | 1 | ↓ | ↓ | 0.25 | still adequate to provide complete nitriding. Accordingly, the maximum cross-sectional area in any portions of the interlocking silicon structure is sufficiently small (on the order of just a few microns) that the nitrogen can diffuse completely through the silicon structure to convert essentially all of it to silicon nitride. In the present invention, the sintered silicon particles are more of a continuous structure, so that nitriding occurs into the structure, permitting the final silicon nitride structure to be more continuous.

Tests of the strength of the silicon compacts before and after argon sintering show an order of magnitude increase in strength due to the sintering, thus indicating the existence of the strong silicon to silicon bonds. This provides the continuous silicon skeleton which is subsequently converted in situ to silicon nitride. The average transverse rupture strength increase for the Example 1 argon sintered product showed a strength of 148 psi. before sintering and 1633 psi. after sintering. A similar increase from 97 psi. to 1148 psi. was experienced for the Example 6 compact.

In order to get a quantitative determination of pore size distribution, in the range of 4 microns and above, fracture surfaces were examined under a scanning electron microscope and photographed at 200x and 100x magnification. These photomicrographs were examined in detail to ascertain the quantitative distribution of these larger pores. On all samples most of the pores were less than 4 microns and accordingly these smaller pores were not counted. From the strength standpoint the larger pores (over 4 microns) are the important ones to consider.

In Table 2 there are two sets of three columns, the first column being representative measurements taken from fracture surfaces of material made in accordance with the present invention. These measurements were made at 200x magnification. The second column, identified as prior art, is taken from a sample which was very similar to material made by the technique described in Example 8 but in this case the isostatic pressure was accomplished at 20,000 psi. rather than the 40,000 psi. of Example 8. The specific material examined and re- It is noted from the above examples that the product of the present invention has a high ratio of alpha to beta silicon nitride in the final product. This is believed to be due to the fact that the nitriding takes place at a relatively low temperature and can go to completion at this low temperature. This is a result of the rather short diffusion path within the solid silicon which is to be nitrided due to the small particle size employed in the initial compact.

In the above examples, it should be noted that there is an appreciable concentration of the impurities iron, aluminum and calcium. While the exact role of these impurities is not completely understood, it has been demonstrated that inferior performance is obtained when ultra pure silicon is used as the raw material. It is believed that the sintering action is aided by these impurities, although it is also believed that there is no glassy bond in the sintering of the silicon to the silicon. The metallic impurities probably act to provide a eutectic so that the sintering takes place at a temperature lower than normally could be accomplished. Since all silicon powder will have some oxide film on its surface, it may be that these impurities assist in breaking down the oxide film during the sintering operation to provide the silicon to silicon bond.

In the specific example mentioned above, a mixture of nitrogen and ammonia is used in the furnace. This seems to be preferred, although it is a normal procedure.

While argon is mentioned as the preferred atmosphere for sintering the raw silicon compact prior to machining, other gaseous atmosphere, such as helium, the other noble gases, hydrogen and other gases which are nonreactive with silicon at temperatures on the order of 1100° – 1250° C. can be used. Gases containing nitrogen, oxygen or carbon are generally not suitable for this purpose.

While cold isostatic pressing has been described as the preferred method of compacting the fine silicon powder to a green density of at least 1.45 grams/cc, the pressing may be performed in the presence of heat (and inert atmosphere) as well, in which case the separate inert gas sintering step can be partially or completely eliminated.

What is claimed is:

1. The process of forming a shaped body of silicon nitride having a transverse rupture strength in excess of 40,000 psi, which comprises the steps of compressing fine silicon powder to a green density of at least 1.45 grams/cc., the starting silicon powder having a generally uniform particle size and being essentially free of particles having a diameter greater than about 10 microns, sintering the compressed powder in an inert atmosphere essentially free of nitrogen, carbon, and oxygen, to form an interlocking silicon structure having silicon to silicon bonds between the fine particles, the maximum cross-sectional dimensions in the interlocking silicon structure being on the order of a few microns, and thereafter firing the silicon structure in a nitrogen containing atmosphere to convert the structure into a continuous silicon nitride body having essentially no pores greater than 15 microns a portion of the nitriding step being above the sintering temperature.

2. The process of claim 1 wherein the starting powder contains at least 1% total impurities selected from the group consisting of iron, aluminum and calcium.

3. The process of forming a shaped body of silicon nitride having a transverse rupture strength in excess of 40,000 psi. which comprises the steps of compressing fine silicon powder to a green density of at least 1.45 grams/cc., the starting silicon powder being essentially free of particles having a diameter greater than about 10 microns and having an average diameter on the order of 2 microns, sintering the compressed powder to a temperature on the order of 1100° C. in an inert atmosphere essentially free of nitrogen, carbon, and oxygen, to form an interlocking silicon structure having silicon to silicon bonds between the fine particles, the maximum cross-sectional dimensions in the interlocking silicon structure being on the order of a few microns, and thereafter firing the silicon structure in a nitrogen containing atmosphere to convert the structure into a continuous silicon nitride body having essentially no pores greater than 15 microns a portion of the nitriding step being above the sintering temperature.

4. The process of claim 3 including the step of machining the sintered product to final shape prior to firing in nitrogen.

5. The process of claim 1 wherein the sintering is continued until the sintered product has a transverse rupture strength in excess of 1000 psi.

6. The process of claim 1 wherein the sintering step is combined with the compressing step.

7. The process of forming a shaped body of silicon nitride having a transverse rupture strength in excess of 40,000 psi., which comprises the steps of compressing fine silicon powder to a green density of at least 1.45 grams/cc., the starting silicon powder having a generally uniform particle size and being essentially free of particles having a diameter greater than about 10 microns, sintering the compressed powder in an inert atmosphere essentially free of nitrogen, carbon and oxygen, to form an interlocking silicon structure having silicon to silicon bonds between the fine particles, the silicon structure strength depending on silicon to silicon bonds rather than glassy bonds, the maximum cross-sectional dimensions in the interlocking silicon structure being on the order of a few microns, and thereafter firing the silicon structure in a nitrogen containing atmosphere to convert the structure into a continuous silicon nitride body having essentially no pores greater than 15 microns a portion of the nitriding step being above the sintering step, the individual silicon nitride particles of the body being bonded by silicon nitride recrystallization rather than by containing interstitial impurities.

* * * * *